(12) United States Patent
Lee et al.

(10) Patent No.: US 8,388,707 B2
(45) Date of Patent: Mar. 5, 2013

(54) STEAM METHANE REFORMER AND HYDROGEN STATION HAVING IT USING HIGH PERFORMING METAL FIBER BURNER

(75) Inventors: Yongil Lee, Daejeon (KR); Hongseok Jung, Daejeon (KR); Youngseek Yoon, Gwangju (KR); Keunseob Choi, Daejeon (KR); Youngdae Kim, Daejeon (KR)

(73) Assignee: SK Innovation Co., Ltd., Seoul (KR)

( * ) Notice: Subject to any disclaimer, the term of this patent is extended or adjusted under 35 U.S.C. 154(b) by 280 days.

(21) Appl. No.: 12/863,043

(22) PCT Filed: Dec. 9, 2008

(86) PCT No.: PCT/KR2008/007263
§ 371 (c)(1),
(2), (4) Date: Jul. 15, 2010

(87) PCT Pub. No.: WO2009/093807
PCT Pub. Date: Jul. 30, 2009

(65) Prior Publication Data
US 2011/0044868 A1    Feb. 24, 2011

(30) Foreign Application Priority Data
Jan. 25, 2008    (KR) .......................... 10-2008-0008208

(51) Int. Cl.
*B01J 8/00*    (2006.01)
(52) U.S. Cl. ..................................... 48/127.9; 422/629
(58) Field of Classification Search .......... 422/129–242; 429/400–535
See application file for complete search history.

(56) References Cited

U.S. PATENT DOCUMENTS

| | | | |
|---|---|---|---|
| 5,326,631 A | 7/1994 | Carswell et al. | |
| 6,585,785 B1 * | 7/2003 | Warren et al. ................. | 48/127.9 |
| 7,053,014 B2 | 5/2006 | Dewaegheneire | |
| 2002/0152681 A1 * | 10/2002 | Oh et al. ....................... | 48/127.9 |
| 2010/0055518 A1 * | 3/2010 | Chen et al. ..................... | 429/17 |

FOREIGN PATENT DOCUMENTS

| KR | 10-0423544 B1 | 10/2002 |
|---|---|---|
| KR | 10-0783004 B1 | 10/2006 |

* cited by examiner

*Primary Examiner* — Imran Akram
(74) *Attorney, Agent, or Firm* — The Webb Law Firm

(57) ABSTRACT

The steam methane reformer using a premixed metal fiber burner which has a short flame length as well as a high temperature to thereby provide a high efficiency and also reduce a size, and a hydrogen station having the same. The steam methane reformer using a high performing metal fiber burner comprises a reforming part (110a) in which a catalyst for steam-reforming hydrocarbon materials and producing hydrogen is disposed; a combustion part (120) which is provided with a premixed metal fiber burner (120a) for generating heat required for the steam reforming reaction of the reaction tubes (110a); a raw material supplying part (130) for supplying hydrocarbon materials to the reaction tube (110a); and a hydrogen discharging part (140) for discharging hydrogen produced through the steam reforming reaction by the catalyst of the reaction tube (110a).

6 Claims, 5 Drawing Sheets

(a)

(b)

STEAM METHANE REFORMER AND HYDROGEN STATION HAVING IT USING HIGH PERFORMING METAL FIBER BURNER

TECHNICAL FIELD

The present invention relates to a steam methane reformer and a hydrogen station having it using a high performing metal fiber burner, and more particularly, to a steam methane reformer using a premixed metal fiber burner which has a short flame length as well as a high temperature to thereby provide a high efficiency and also reduce a size, and a hydrogen station having the same.

BACKGROUND ART

A hydrogen station is a system for producing, transporting and storing hydrogen and also charging an object which uses the hydrogen like a fuel cell. To solve problems of gradual exhaustion of fossil fuel and environmental pollution due to the fossil fuel, various technologies using hydrogen have been studied.

In particular, the fuel cell is a power generation system in which chemical energy is converted into electric energy by an electrochemical reaction of hydrogen and oxygen to generate electric power. Therefore, it is necessary to stably supply hydrogen as a fuel.

The hydrogen station can be divided into a type of having its own hydrogen generating means, a type of charging hydrogen generated from separate hydrogen generating means, and a movable type. The hydrogen generating means can be also classified into various types according to raw materials used and manufacturing methods.

More detailedly, the hydrogen generating means employs steam reforming using nature gas, electrolysis using water, coal gasification using coal and the like, and particularly, the hydrogen generating means using the steam reforming can use all kinds of hydrocarbons such as natural gas, LPG, LNG, gasoline and kerosene, as raw materials, and also its manufacturing cost is low. Thus, it has been studied widely.

The hydrogen generating means using the steam reforming (hereinafter, called 'steam methane reformer') uses a catalyst requiring a high temperature and thus generation of the high temperature is necessary.

However, in a conventional burner, since it has a long flame length and a low temperature, an efficient reforming reaction is not performed by the catalyst and thus productivity of hydrogen is lowered.

Further, since the burner used in a conventional hydrogen station or the reformer has a non-uniform and large flame and a large amount of incompletely burnt components is contained in exhaust gas, and it causes activity of the reforming catalyst to be deteriorated. Therefore, the performance of the hydrogen station or the reformer is lowered.

Furthermore, in case that a flashback of the flame is occurred and thus the flame is not generated in a designed direction, the reforming reaction itself may not be generated in the steam methane reformer and also other parts may be easily damaged.

DISCLOSURE

Technical Problem

An object of the present invention is to provide a steam methane reformer which can rapidly and stably increase a temperature to a desired level required for a reforming process by using a premixed metal fiber burner to thereby increase productivity of hydrogen and which has a short flame length to thereby provide a high efficiency and also improve durability, and a hydrogen station having it using a high performing metal fiber burner.

Technical Solution

To achieve the above objects, the present invention provides a steam methane reformer using a high performing metal fiber burner, comprising a reforming part which is provided with a plurality of reaction tubes in which a catalyst for steam-reforming hydrocarbon materials and producing hydrogen is disposed; a combustion part which is provided with a premixed metal fiber burner for generating heat required for the steam reforming reaction of the reaction tubes; a raw material supplying part for supplying hydrocarbon materials to the reaction tube; and a hydrogen discharging part for discharging hydrogen produced through the steam reforming reaction by the catalyst of the reaction tube.

Preferably, the premixed metal fiber burner comprises a main body formed with a cylindrical premixing chamber in which air, fuel and hydrogen are mixed; a metal fiber mat which is formed at one side of the main body to form a flame; a fuel/air supplying part which is formed at the other side of the main body to supply the air or fuel; a hydrogen supplying part which is formed at another side of the main body to supply the hydrogen; and ignition part for igniting the metal fiber mat.

Preferably, the premixing chamber includes flashback preventing means which is formed with a plurality of specially designed slits and holes and arranged orthogonally to a flowing direction of the fuel, the air or the hydrogen so as to increase a flowing speed of the fuel, the air or the hydrogen and also transfer heat of the flame to a peripheral portion thereof, thereby preventing the flame in the metal fiber mat from being moved to the premixing chamber, and the premixed metal fiber burner further includes a mixing part in which the fuel and the air or the hydrogen are mixed before being introduced into the premixing chamber.

Preferably, the flashback preventing means is provided in plural in a length direction of the premixing chamber, and a surface area of the specially designed slits and holes is gradually reduced, as flashback preventing means is disposed to be adjacent to the metal fiber mat, and the hydrogen supplying part supplies hydrogen containing a large amount of inert gas.

Preferably, the premixed metal fiber burner is disposed at one side of the steam methane reformer, and the combustion part is formed in a direction of flame generated by the premixed metal fiber burner, and the reforming part is formed to enclose the combustion part, and the premixed metal fiber burner has a plurality of temperature measuring means.

Preferably, the pressure control means is a pressure control system including an adjustable pressure control passage, or a pressure-loss tube in which pressure of hydrocarbon material is lowered while the hydrocarbon material is passing through.

Further, the present invention provides a hydrogen station, comprising a steam methane reformer as described above; separating/refining means for increasing hydrogen purity contained in gas collected by the hydrogen discharging part of the steam methane reformer; hydrogen injecting means for charging hydrogen having a high purity to a target object; and a storing part for storing the produced hydrogen.

Advantageous Effects

Therefore, since the steam methane reformer using the high performing metal fiber burner and the hydrogen station using the same employ the premixed metal fiber burner, it is possible to rapidly increase a temperature to a desired level required for the steam reforming reaction, thereby improving hydrogen productivity, and also since the premixed metal fiber burner has a relatively short flame length and stably heats a wide range, thereby reducing a size and also reducing harmful exhaust emissions.

DESCRIPTION OF DRAWINGS

The above and other objects, features and advantages of the present invention will become apparent from the following description of preferred embodiments given in conjunction with the accompanying drawings, in which.

DETAILED DESCRIPTION OF MAIN ELEMENTS

| | |
|---|---|
| 1000: hydrogen station | |
| 100: steam methane reformer | 110a: reaction tube |
| 110: reforming part | 120: combustion part |
| 120a: premixed metal fiber burner | 121: main body |
| 122: premixing chamber | 123: mixing part |
| 124: metal fiber mat | 125: fuel/air supplying part |
| 126: hydrogen supplying part | 127: ignition means |
| 128: flashback flame preventing means | |
| 129: specially designed slits and holes | |
| 130: raw material supplying part | |
| 140: hydrogen discharging part | |
| 160: temperature measuring means | |
| 200: separating/refining means | |
| 300: hydrogen injecting means | 400: storing part |

BEST MODE

Hereinafter, the embodiments of the present invention will be described in detail with reference to accompanying drawings.

Figure 1:
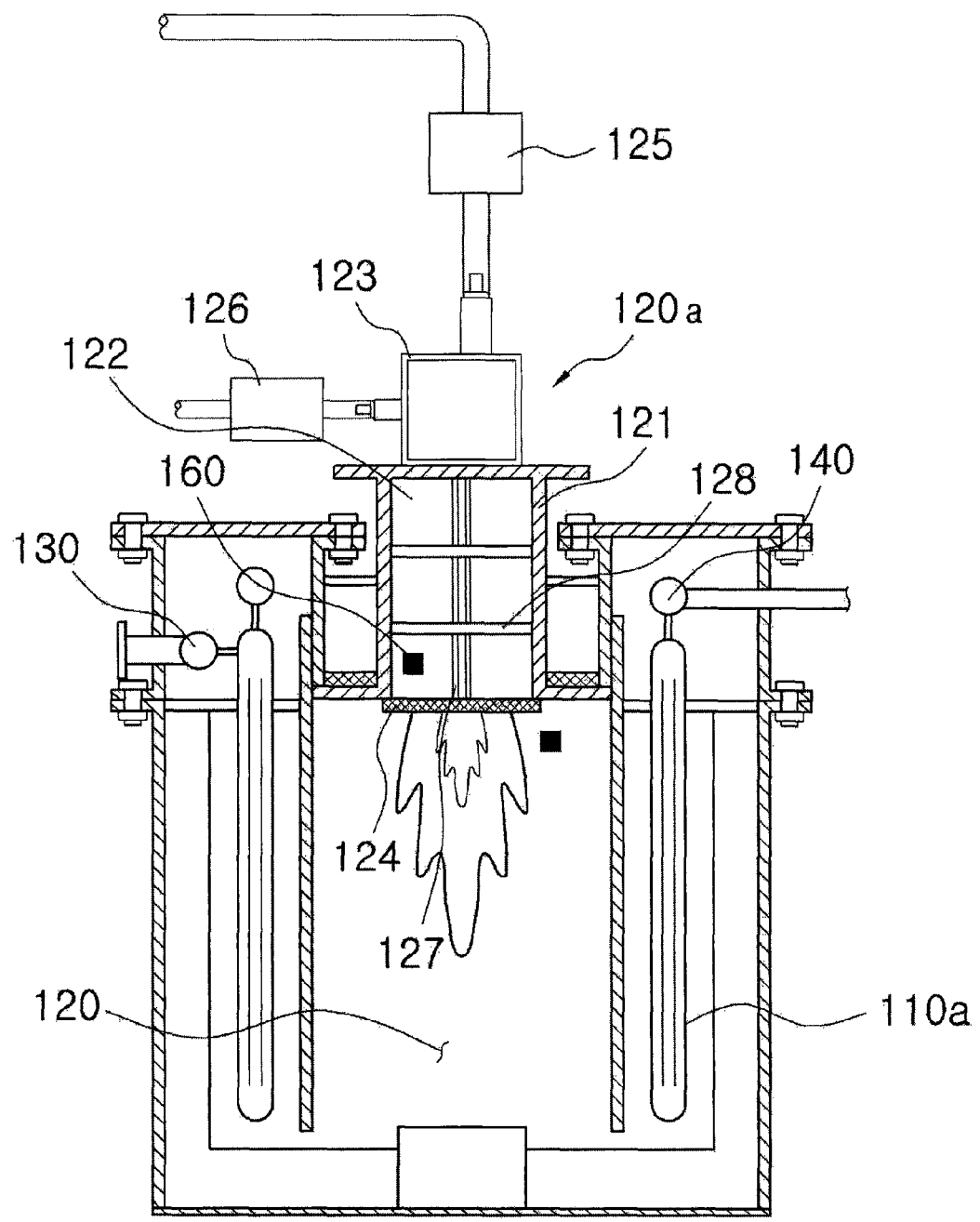
FIG. 1 is a cross-sectional view of a steam methane reformer according to the present invention.
Figure 2:
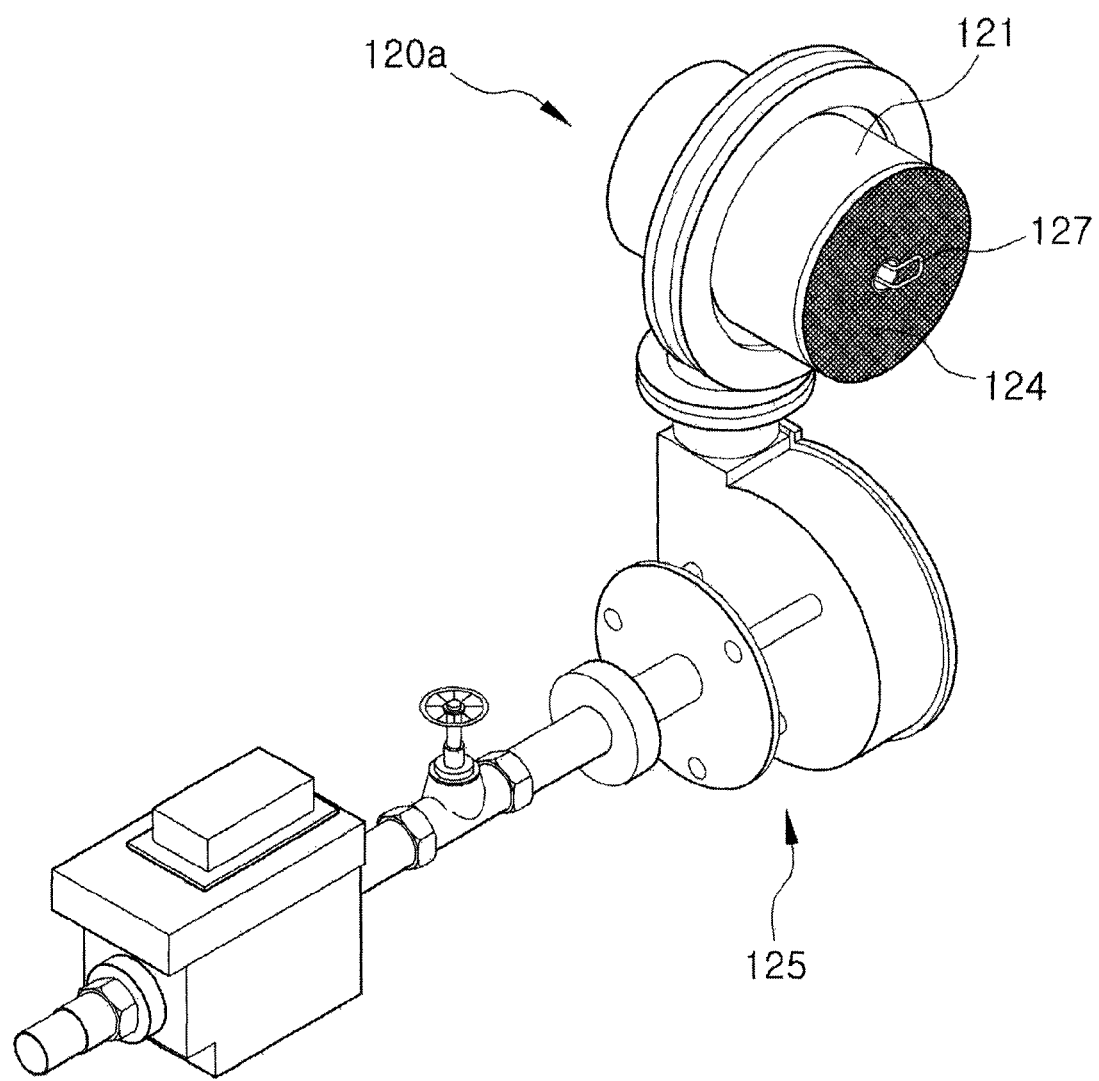
FIG. 2 is a perspective view of a premixed metal fiber burner of the steam methane reformer of FIG. 1.
Figure 3:
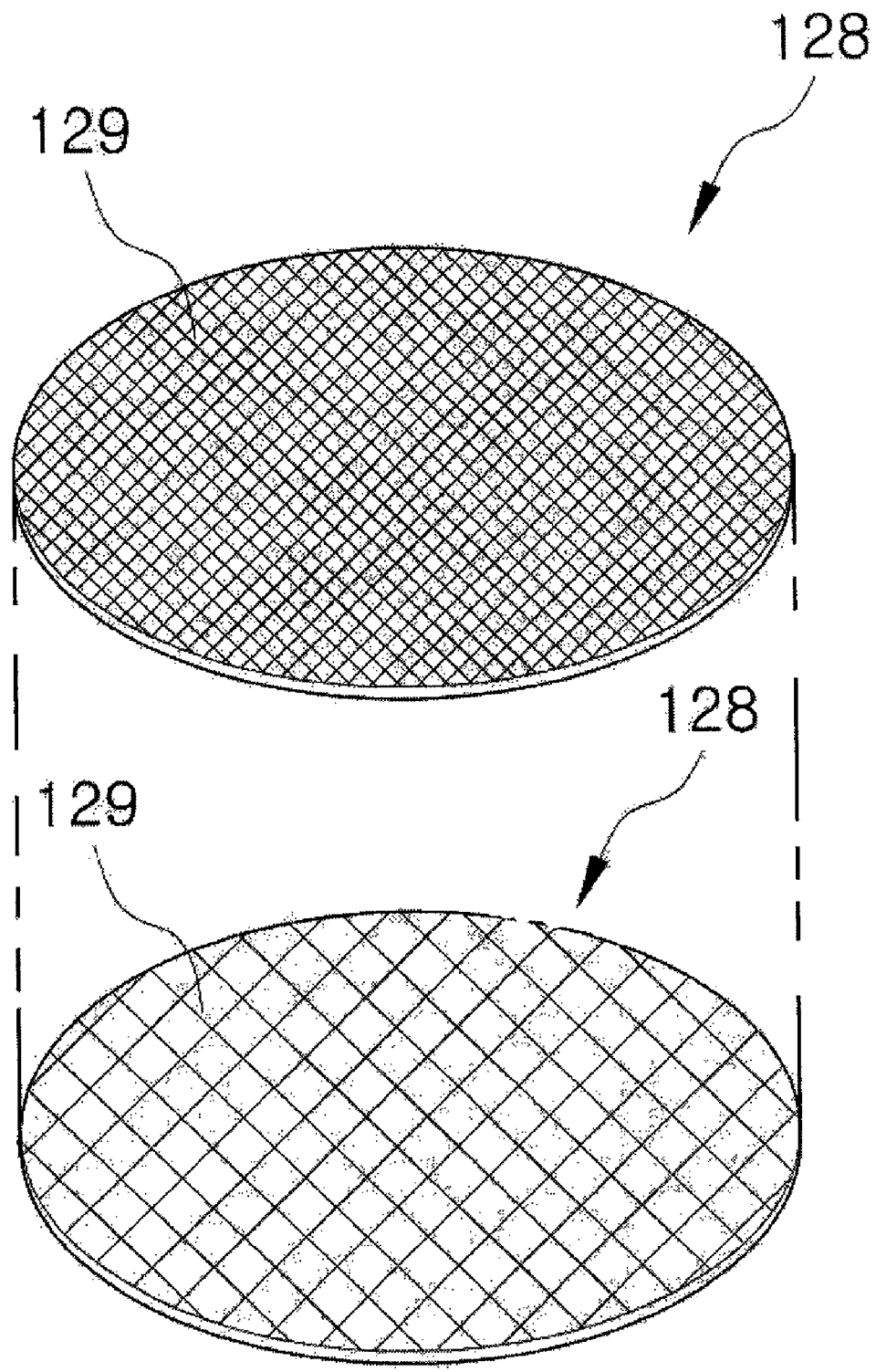
FIG. 3 is a perspective view of back flame preventing means.
Figure 4:
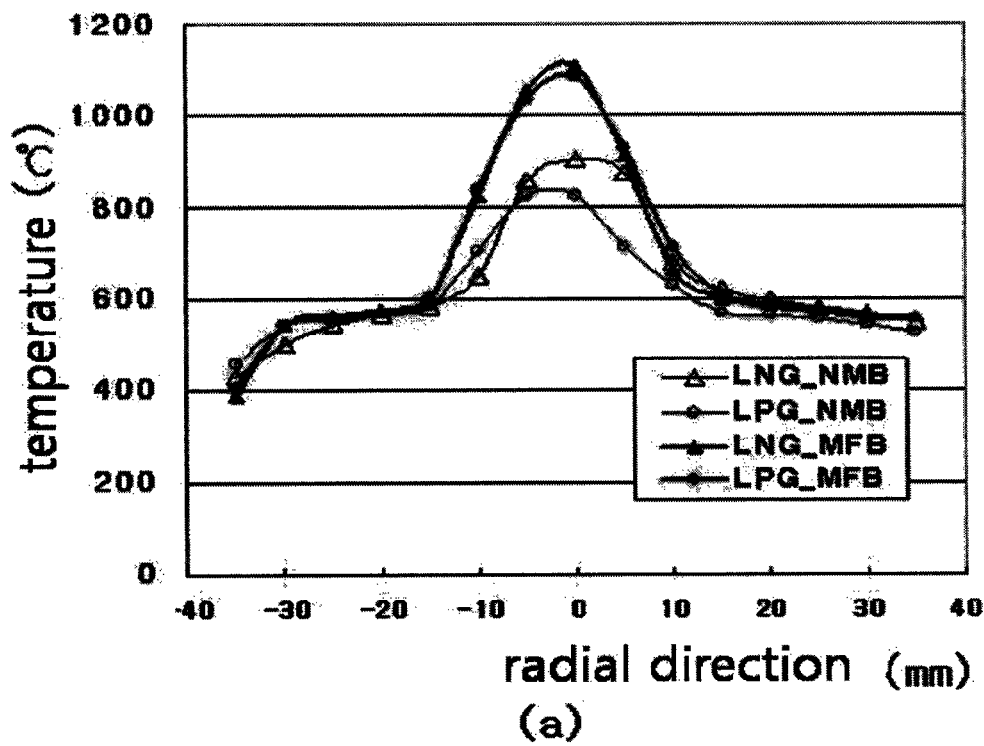
FIG. 4 is a graph showing an internal temperature of a combustion part when the premixed metal fiber burner is used.
Figure 4:
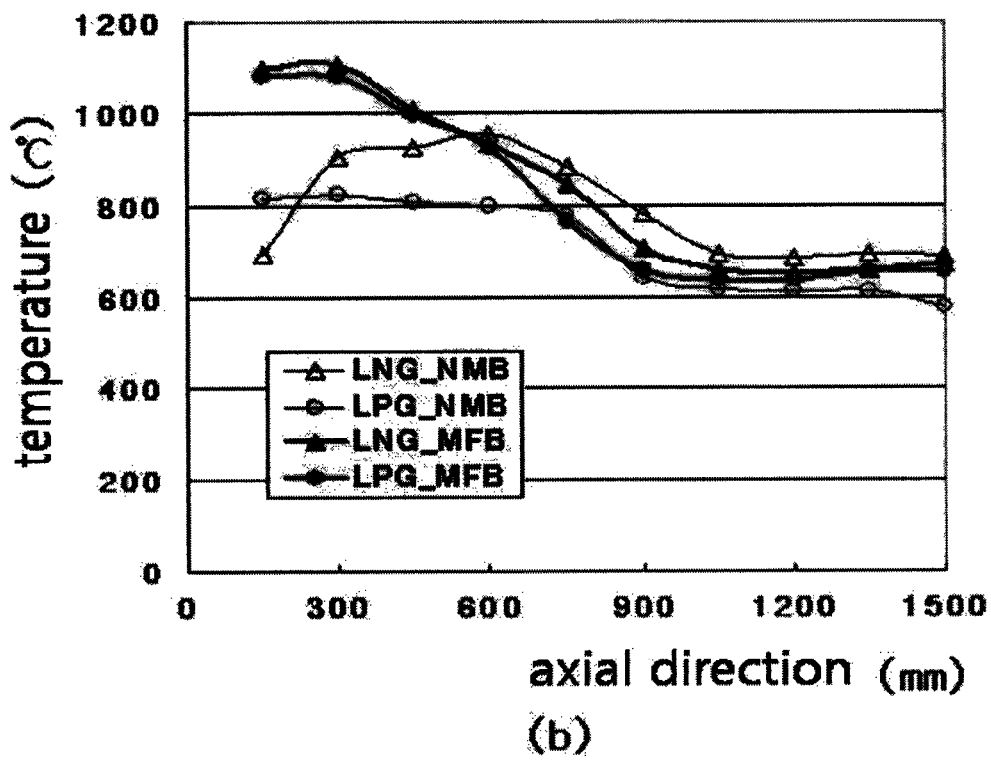

FIG. 1 is a cross-sectional view of a steam methane reformer 100 according to the present invention, FIG. 2 is a perspective view of a premixed metal fiber burner 120a of the steam methane reformer 100 of FIG. 1, FIG. 3 is a perspective view of flashback preventing means 128, FIG. 4 is a graph showing an internal temperature of a combustion part 120 when the premixed metal fiber burner 120a is used.

The steam methane reformer 100 according to the present invention includes a reforming part 110 which produces hydrogen by a reforming reaction, and a combustion part 120 which maintains a high temperature required for the reforming reaction. The reforming part 110 is provided with a plurality of reaction tubes 110a in which a catalyst for steam-reforming hydrocarbon materials and producing hydrogen is disposed, respectively.

The combustion part 120 is provided with the premixed metal fiber burner 120a which generates heat required for the steam reforming reaction, and the premixed metal fiber burner 120a will be fully described below.

The steam methane reformer 100 of the present invention further includes a raw material supplying part 130 for supplying the hydrocarbon materials to the reaction tube 110a of the reforming part 110, and a hydrogen discharging part 140 for discharging hydrogen produced by the steam reforming reaction.

The steam methane reformer 100 using a high performing metal fiber burner according to the present invention, as shown in FIG. 1, is an example showing that the premixed metal fiber burner 120a is disposed at an upper center portion of the steam methane reformer 100 so that the combustion part 120 is formed at a center portion thereof in a direction of flame generated by the premixed metal fiber burner 120a and the reforming part 110 is formed to enclose the combustion part 120. In case that the plurality of reaction tubes 110a are provided in the structure of FIG. 1, it is possible to uniformly apply heat to each reaction tube 110a, thereby improving the efficiency thereof.

The raw material supplying part 130 for supplying hydrocarbon fuel such as nature gas, LPG, LNG, gasoline and kerosene includes a passage through which the hydrocarbon fuel can be flowed. The hydrogen discharging part 140 for facilely transporting hydrogen produced by the reforming reaction to a next process also includes a passage through which the hydrogen can be flowed.

As shown in FIGS. 1 and 2, the steam methane reformer 100 of the present invention can form a high temperature environment required for the steam reforming reaction of the catalyst by using the premixed metal fiber burner 120a.

The premixed metal fiber burner 120a includes a main body 121 formed with a cylindrical premixing chamber 122 in which air, fuel and hydrogen are mixed, a metal fiber mat 124 which is formed at one side of the main body 121 to form the flame, a fuel/air supplying part 125 which is formed at the other side of the main body 121 to supply air or fuel necessary to form the flame, a hydrogen supplying part 126 which is formed at another side of the main body 121 to supply the hydrogen, and ignition part 127 for igniting the metal fiber mat 124.

The main body 121 is a basic housing for forming the premixed metal fiber burner 120a and is formed with the premixing chamber 122 in which the fuel, the air and the hydrogen are mixed before moving to the combustion part 120.

The metal fiber mat 124 forms the flame toward the combustion part 120 and is formed of NIT200S and Fe—Cr based alloy. The metal fiber mat 124 has a "knitted" shape through which the fuel, the air and the hydrogen in the premixing chamber 122 can be flowed.

The fuel/air supplying part 125 includes air blowing means, a valve for controlling the air flow rate, a valve for controlling the fuel flow rate and controlling means for controlling valves. The fuel/air supplying part 125 for supplying the fuel or air necessary to generate the flame is provided at the other side of the main body 121 that the metal fiber mat 124 is not disposed. The hydrogen supplying part 126 is also provided at the other side of the main body 121 so that the combustion occurs facilely and simulate off-gas condition.

At this time, since the hydrogen has an excellent combustion characteristic, the flame formed by the metal fiber mat 124 may be flowed back. Therefore, the hydrogen supplying part 126 is connected through a pipe having a small diameter, separately from the fuel/air supplying part 125.

The premixed metal fiber burner 120a further includes a mixing part 123 in which the fuel and the air or the hydrogen are mixed before being introduced into the premixing chamber 122. Preferably, the hydrogen supplying part 126 has a structure which allows an inert gas content of the hydrogen to be increased, thereby supplying the hydrogen containing a large amount of inert gas like nitrogen gas and thus preventing the flashback of the flame.

Further, it is preferable that the premixed metal fiber burner 120a of the present invention further includes flashback preventing means 128 which is disposed in the premixing chamber 122 and formed with a plurality of specially designed slits and holes 129 to prevent the flashback of the flame.

The flashback preventing means 128 is arranged to be orthogonal to the flowing direction of the fuel, the air or the hydrogen (i.e., to form a surface orthogonal to an axial direction of the premixing chamber 122), thereby preventing the flashback of the flame. Furthermore, the fuel, the air and the hydrogen are mixed with each other while passing through the flashback preventing means 128, thereby stably generating the flame, preventing incomplete combustion and thus reducing exhaust emissions.

In addition, the flashback preventing means 128 functions to increase a flowing speed of the mixture of the fuel, the air or the hydrogen, and also transfer the heat of the flame to the peripheral portion thereof, thereby prevent the flame in the metal fiber mat 124 from being flowed to the premixing chamber 122.

As shown in FIG. 3, the flashback preventing means 128 may be provided in plural. In this case, it is preferable that the surface area of specially designed slits and holes 129 is gradually reduced, as the flashback preventing means 128 is disposed to be adjacent to the flame position. In FIG. 3, the flame is generated upward.

The ignition means 127 functions to ignite the metal fiber mat 124, and it can be also used as an auxiliary spark when the metal fiber mat 124 maintains the flame.

In the steam methane reformer 100 of the present invention, the premixed metal fiber burner 120a is provided with a plurality of temperature measuring means 160 so as to observe the flame characteristic and previously detect the possibility of the flashback.

The temperature measuring means 160 may be provided in the metal fiber mat 124 or the premixing chamber 122. A thermocouple which is not deformed at the high temperature may be used as the temperature measuring means 160 so as to measure the temperature in a very high temperature environment.

FIG. 4 is a graph showing a temperature distribution of the premixed metal fiber burner 120a according to the present invention, wherein FIG. 4a is a graph of the temperature distribution in a radial direction at a depth of 300 mm of the combustion part 120 and FIG. 4b is a graph of the temperature distribution according to an axial length thereof.

In order to compare the temperature characteristic with a conventional burner, a nozzle mixing burner (NMB) having a capacity of 55,000 kcal/hr and the premixed metal fiber burner 120a of FIG. 2 are compared in FIG. 4.

The premixed metal fiber burner used in FIG. 4 has a capacity of 51,269 kcal/hr, and the fuel is supplied to the metal fiber mat 124 which has a diameter of 130 mm. And the mat is formed of a Fe—Cr based alloy of having the maximum durable surface temperature of 1,150° C.

In FIG. 4, a hollow triangle (LNG_NMB) shows a temperature of the nozzle mixing burner in a status of LNG of 70% combustion load and Excess $O_2$ of 8%, a hollow circle (LPG_NMB) shows a temperature of the nozzle mixing burner in a status of LPG of 70% combustion load and Excess $O_2$ of 8%, a solid triangle (LNG_NMB) shows a temperature of the premixed metal fiber burner 120a in a status of LNG of 70% combustion load and Excess $O_2$ of 8%, and a solid circle (LPG_NMB) shows a temperature of the premixed metal fiber burner 120a in a status of LPG of 70% combustion load and Excess $O_2$ of 8%.

As shown in FIG. 4, the premixed metal fiber burner 120a of the present invention has the higher flame temperature than the nozzle mixing burner. Particularly, it can be understood that the flame temperature becomes higher at a radially center portion of the metal fiber mat 124 and at a portion adjacent to the metal fiber mat 124 in an axial direction.

Table 1 shows CO concentrations in the nozzle mixing burner and the premixed metal fiber burner 120a. As described in Table 1, the premixed metal fiber burner 120a has a maximum CO concentration of 32 ppm (conditions: LNG of 50% combustion load, Excess $O_2$ of 10%), and shows a low CO concentration on the whole. However, the nozzle mixing burner has a maximum CO concentration of 6500 ppm and shows a very high CO concentration on the whole.

Therefore, it can be understood that the premixed metal fiber burner 120a has a better combustion characteristic than the nozzle mixing burner.

TABLE 1

CO concentrations of the nozzle mixing burner and the premixed metal fiber burner 120a in each combustion condition

| | | Excess $O_2$, % | | | | |
|---|---|---|---|---|---|---|
| Fuel | Load | 2 | 4 | 6 | 8 | 10 |
| (a) premixed metal fiber burner | | | | | | |
| LNG | 50 | 0 | 0 | 0 | 10 | 32 |
| | 70 | 0 | 0 | 1 | 1 | 1 |
| | 100 | 0 | 0 | 1 | 1 | 1 |
| LPG | 50 | 1 | 0 | 1 | 0 | 6 |
| | 70 | 0 | 0 | 0 | 0 | 0 |
| | 100 | 0 | 0 | 0 | 0 | 0 |
| (b) nozzle mixing burner | | | | | | |
| LNG | 50 | 980 | 91 | 69 | 126 | 250 |
| | 70 | 5 | 0 | 1 | 15 | 40 |
| | 100 | 31 | 7 | 6 | 4 | 9 |
| LPG | 50 | 7500 | 4000 | 640 | 245 | 260 |
| | 70 | 4400 | 330 | 101 | 52 | 107 |
| | 100 | 4000 | 62 | 27 | 32 | 53 |

Figure 5:
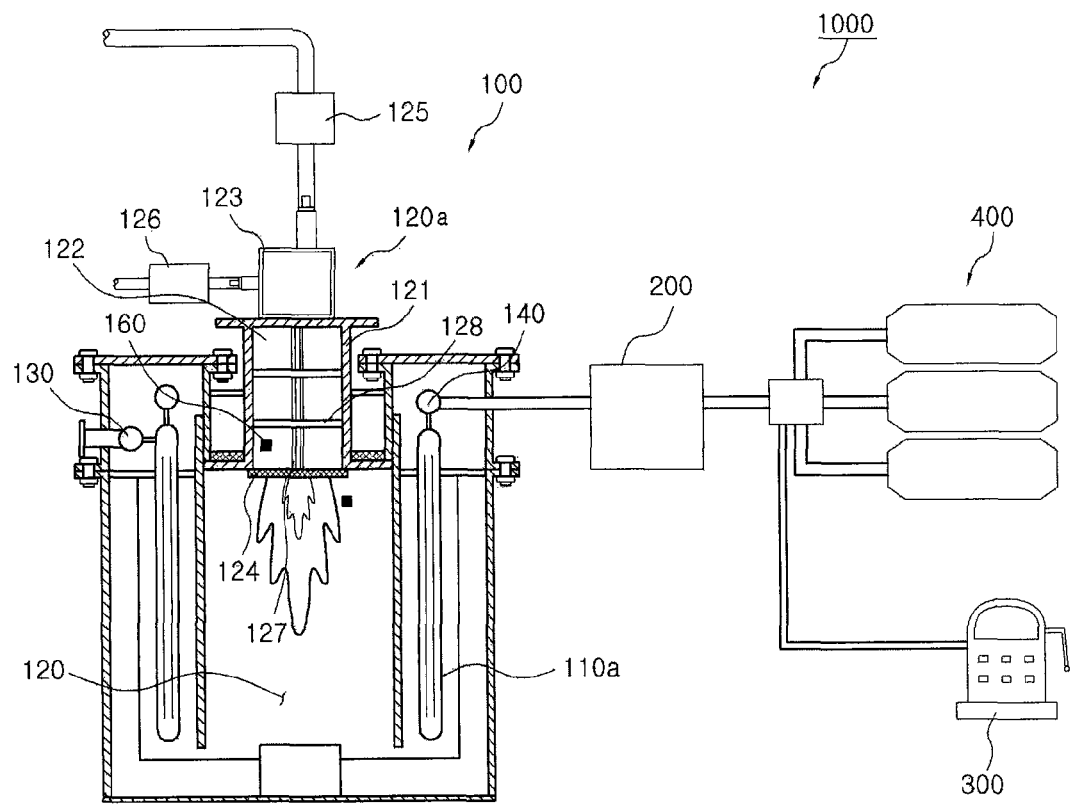
FIG. 5 is a schematic view of a hydrogen station according to the present invention.

FIG. 5 is a schematic view of a hydrogen station 1000 according to the present invention. The hydrogen station 100 includes the steam methane reformer 100 as described above, separating/refining means 200 for separating/refining hydrogen gas produced by the steam methane reformer 100, hydrogen injecting means 300 for charging hydrogen having a high purity to a target object and a storing part 400 for storing the produced hydrogen.

Since gas containing the hydrogen produced by the steam methane reformer 100 also contains other impurities like CO, the separating/refining means 200 functions to remove the impurities so that the hydrogen maintains a desired purity level.

As described above, since the hydrogen station 1000 employs the premixed metal fiber burner 120a, it is possible to rapidly increase a temperature to a desired level required for the steam reforming reaction, thereby improving hydrogen productivity, and also it is possible to reduce harmful exhaust emissions like CO, thereby increasing produced hydrogen purity and thus reducing load of the separating/refining means 200.

The hydrogen injecting means 300 functions to charge to the target object the hydrogen produced by the steam methane reformer 100 and the separating/refining means 200, and the target object is, for example, a vehicle using a fuel cell and the like.

Furthermore, the hydrogen injecting means 300 may be configured so as to supply the hydrogen stored in the storing part 400.

Those skilled in the art will appreciate that the conceptions and specific embodiments disclosed in the foregoing description may be readily utilized as a basis for modifying or designing other embodiments for carrying out the same purposes of the present invention. Those skilled in the art will also appreciate that such equivalent embodiments do not depart from the spirit and scope of the invention as set forth in the appended claims.

Industrial Applicability

According to the present invention, since the steam methane reformer using the high performing metal fiber burner and the hydrogen station using the same employ the premixed metal fiber burner, it is possible to rapidly increase a temperature to a desired level required for the steam reforming reaction, thereby improving hydrogen productivity, and also since the premixed metal fiber burner has a relatively short flame length and stably heats a wide range, thereby reducing a size and also reducing harmful exhaust emissions.

The invention claimed is:

1. A steam methane reformer using a high performing metal fiber burner, comprising:
   a reforming part (110) which is provided with a plurality of reaction tubes (110a) in which a catalyst for steam-reforming hydrocarbon materials and producing hydrogen is disposed;
   a combustion part (120) which is provided with a premixed metal fiber burner (120a) for generating heat required for the steam reforming reaction of the reaction tubes (110a);
   a raw material supplying part (130) for supplying hydrocarbon materials to the plurality of reaction tubes (110a); and
   a hydrogen discharging part (140) for discharging hydrogen produced through the steam reforming reaction by the catalyst of said plurality of reaction tubes (110a); and
   wherein the premixed metal fiber burner (120a) comprises:
   a main body (121) formed with a cylindrical premixing chamber (122) in which air, fuel, and hydrogen are mixed;
   a metal fiber mat (124) which is formed at one side of the main body (121) to form a flame;
   a fuel/air supplying part (125) which is formed at the other side of the main body (121) to supply the air or fuel;
   a hydrogen supplying part (126) which is formed at another side of the main body (121) to supply the hydrogen; and
   an ignition part (127) for igniting the metal fiber mat 124, and
   wherein the premixing chamber (122) includes flashback preventing means (128) which is formed with a plurality of specially designed slits and holes (129) and arranged orthogonally to a flowing direction of the fuel, the air or the hydrogen so as to increase a flowing speed of the fuel, the air or the hydrogen and also transfer heat of the flame to a peripheral portion thereof, thereby preventing the flame in the metal fiber mat (124) from being flow back to the premixing chamber (122), and
   wherein the premixed metal fiber burner (120a) is disposed at one side of the steam methane reformer (100), and the combustion part (120) is formed in a direction of flame generated by the premixed metal fiber burner (120a), and the reforming part (110) is formed to enclose the combustion part (120).

2. The steam methane reformer according to claim 1, wherein the premixed metal fiber burner (120a) further includes a mixing part (123) in which the fuel and the air or the hydrogen are mixed before being introduced into the premixing chamber (122).

3. The steam methane reformer according to claim 1, wherein the flashback preventing means (128) is provided in plural in a length direction of the premixing chamber (122), and a surface area of specially designed slits and holes (129) is gradually reduced, as the back flame preventing means (128) is disposed to be adjacent to the metal fiber mat (124).

4. The steam methane reformer according to claim 1, wherein the hydrogen supplying part (126) supplies hydrogen containing a large amount of inert gas.

5. The steam methane reformer according to claim 1, wherein the premixed metal fiber burner (120a) has a plurality of temperature measuring means (160).

6. A hydrogen station, comprising:
   a steam methane reformer (100) according to any one of claims 1 to 5;
   separating/refining means (200) for increasing hydrogen purity contained in gas collected by the hydrogen discharging part (140) of the steam methane reformer (100);
   hydrogen injecting means (300) for charging hydrogen having a high purity to a target object; and
   a storing part (400) for storing the produced hydrogen.

* * * * *

UNITED STATES PATENT AND TRADEMARK OFFICE
CERTIFICATE OF CORRECTION

PATENT NO. : 8,388,707 B2  Page 1 of 1
APPLICATION NO. : 12/863043
DATED : March 5, 2013
INVENTOR(S) : Lee et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 232 days.

Signed and Sealed this

First Day of September, 2015

Michelle K. Lee
*Director of the United States Patent and Trademark Office*